Figure 1:
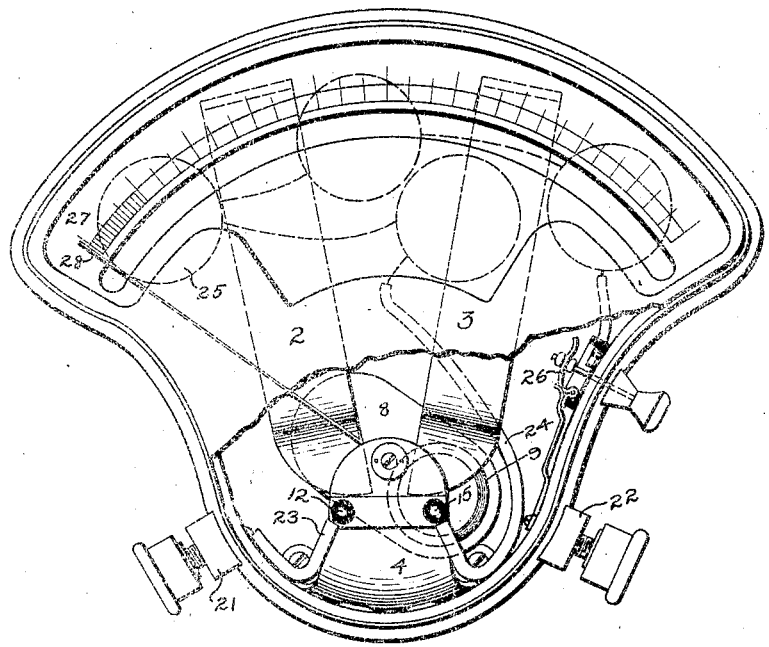

No. 801,419. PATENTED OCT. 10, 1905.
E. THOMSON.
ELECTRIC MEASURING INSTRUMENT.
APPLICATION FILED FEB. 15, 1905.

Witnesses:
Harold F. Locke.
Helen Oxford

Inventor:
Elihu Thomson.
By Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC MEASURING INSTRUMENT.

No. 801,419.      Specification of Letters Patent.      Patented Oct. 10, 1905.

Application filed February 15, 1905. Serial No. 245,751.

*To all whom it may concern:*

Be it known that I, ELIHU THOMSON, a citizen of the United States, residing at Swampscott, in the county of Essex and State of Massachusetts, have invented certain new and useful Improvements in Electric Measuring Instruments, of which the following is a specification.

This invention relates to electric measuring instruments, such as voltmeters and wattmeters; and its object is to effect certain improvements in the construction of instruments of this type whereby an inexpensive and reliable instrument is obtained, which will give accurate readings with reference to a scale extending over a large angle and having the scale-markings thereon evenly distributed.

One of the features of novelty of my invention lies in the arrangement of the coil of the moving element. This coil is wound within a large opening in the thin metallic plate, which coöperates with the permanent or electromagnets to dampen the movements of the indicator. The width of the coil is the same as that of the plate, and therefore the length of the air-gap of the magnets can be reduced to a minimum. The length of the gap need exceed the width of the plate only enough to allow for free movement of the plate therein. The magnetic field is therefore a strong one and the leakage is small, so that the torque of the moving element is high. Also if permanent magnets are used they will remain of more nearly constant strength than if a larger air-gap were employed. The coil is preferably circular, and the pole ends of the magnets are rounded off in such a way that the movement of the moving element for a given variation of the current or voltage will be the same at all points in the range of movement of the indicator. This gives evenly-distributed scale-markings; but, if desired, the shape of the coil and the pole ends of the magnets may be varied to make the scale-markings more open at one point than another—as, for instance, more open about the normal running-point of a generator.

Another feature of my invention is the arrangement of the spring which furnishes the zero-seeking force. For this purpose I employ a long helical spring and secure both its ends to the shaft of the moving element and its middle portion to a stationary part of the instrument. By this arrangement both halves of the spring act together to restore the moving element to the zero position.

The novel features of my invention will be better understood by reference to the following description, taken in connection with the accompanying drawings, which show the preferred embodiment of my invention, and in which—

Figure 2:
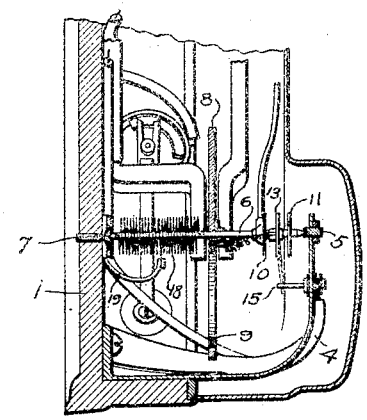
Figure 3:
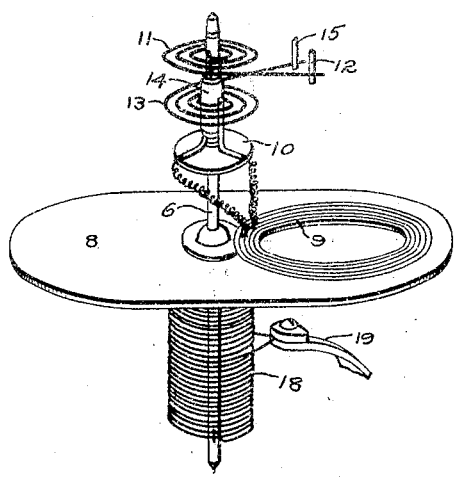

Figure 1 is a plan view of the instrument, broken away in part. Fig. 2 is a section of a portion of the instrument, and Fig. 3 is a perspective view of the moving element. In the drawings I have shown my improvements embodied in a direct-current voltmeter, as the novel form of coil is best adapted for this use; but I wish it understood that my improvements are applicable generally to measuring instruments of all classes.

Referring to the drawings, 1 indicates a base upon which are mounted two permanent magnets 2 and 3. Secured to the base 1 is a standard 4, in the end of which is a bearing 5 for one end of the shaft 6 of the moving element, the other end of which is supported in a bearing 7, mounted on the base 1. Secured on shaft 6 is a plate 8, with curved ends, as shown in Figs. 1 and 3, in which is a large round opening on one side of the shaft. This plate, besides carrying the coil of the moving element, coöperates with the magnets 2 and 3 to dampen the movements of the indicating system and is preferably made of aluminium, so that the ratio of the weight of the moving element to the torque of the instrument will be as large as possible. The coil 9 of the moving element is mounted within the opening in plate 8. It is of rectangular section, as shown in Fig. 2, and its width is preferably the same as the width of the plate. The coil is held in position and the several turns of the coil are held together by a thin film of varnish, with which it is coated. The ends of the coil are secured to a supporting-disk 10, of insulating material, mounted on shaft 6, from which one of the wires extends up along an insulating-sleeve on the shaft to the inner end of a flexible spiral 11, the outer end of which is secured to a pin 12, extending through the standard 4, but insulated therefrom by a suitable bushing. The other end of the coil 9 is connected to the end of a second flexible spiral 13, secured on shaft 6, but insulated therefrom and from the other end of coil 9 by a sleeve 14, of insulating material. The other end of this spiral is secured to a second pin 15, extending through but insulated from standard 4. The permanent magnets 2 and 3 have the poles drawn together closely to form small air-gaps. The coil 9 being mounted in an opening in plate 8 does not add to the width of the portion of the moving element, which moves in the fields of the magnets, and therefore the gaps of the magnets can be made very small with the resultant advantages of a strong field and a small amount of leakage. Also on account of the small gap the strength of the magnets will remain more nearly constant throughout a long period of use of the instrument. The pole ends of the magnets are so shaped that the coil moves out of the field as the moving element turns on its pivot at just the rate necessary to give the desired distribution of the scale-markings. In the drawings I have shown the pole ends rounded off on the corners away from the shaft to give an even spacing of the markings throughout the scale.

The zero-seeking force is supplied by a long helical spring 18, which surrounds shaft 6 and has both ends attached thereto. The middle portion of this spring is secured to the end of a bracket 19, mounted on the base 1. It will thus be seen that as the moving element turns on its pivots half of the spring is wound up and the other half unwound, so that both of the sections tend to bring the moving element back to the zero position. Obviously this arrangement could be reversed, if desired,—that is, the middle portion of the spring could be secured to the shaft and the ends to stationary portions of the instrument.

In the sides of the instrument are two binding-posts 21 and 22, by which the instrument is connected in circuit. Binding-post 21 is connected by a lead 23 with the insulated pin 12, supported on standard 4, from which connection is made by the flexible spiral 11 to the moving coil 9. The other end of the coil is connected, through the spiral 13, to the insulated pin 15, which is connected by a lead 24 to a series of spools 25 of resistance-wire secured on the base of the instrument. The other side of the spools is connected, through a switch 26, operated from outside the casing of the instrument, to the binding-post 22. Mounted above the spools is a scale-plate 27, over which an indicating-needle 28, secured to the shaft 6, moves.

What I claim as new, and desire to secure by Letters Patent of the United States, is:—

1. An electric measuring instrument comprising a magnet having a small air-gap, a metal damping-plate movable in the magnetic field with small clearance, and a current-measuring coil carried by the plate through the field and bounded by planes coincident with those which bound the plate.

2. An electric measuring instrument having means for establishing a magnetic field, a thin metallic plate having an opening therethrough movable in the magnetic field, a coil mounted in said opening, and means for connecting the coil in circuit.

3. An electric measuring instrument having means for establishing a magnetic field, a pivoted shaft, a thin metallic plate having an opening therethrough carried by the shaft and movable in the magnetic field, a coil mounted in said opening of a thickness not greater than that of the plate, and means for connecting the coil in circuit.

4. An electric measuring instrument having a movable element, a thin metallic plate having an opening therethrough carried by said element, a coil mounted in said opening, means for connecting the coil in circuit, and a magnet mounted in position with its poles closely embracing said plate in the field of which the coil is adapted to move.

5. An electric measuring instrument having a pivoted shaft, a thin plate having an opening therethrough carried by the shaft, a coil mounted in said opening, means for connecting the coil in circuit, and a magnet in the field of which the coil is adapted to move.

6. An electric measuring instrument having means for establishing a magnetic field, a pivoted shaft, a thin metallic plate carried thereby movable in the magnetic field, said plate having an opening therethrough on one side of the shaft, a coil mounted in said opening, and means for connecting the coil in circuit.

7. An electric measuring instrument having a pivoted shaft, a thin metallic plate carried thereby having an opening therethrough on one side of the shaft, a coil in said opening, means for connecting the coil in circuit, and two permanent magnets mounted in position with the poles embracing the plate on opposite sides of the shaft.

8. An electric measuring instrument having a pivoted shaft, a thin metallic plate carried thereby having an opening therethrough on one side of the shaft, a coil in said opening of a thickness not greater than that of the plate, means for connecting the coil in circuit, and two permanent magnets mounted in position with the poles closely embracing the plate on opposite sides of the shaft, the coil and poles being so shaped relatively that a definite increase of current in the coil causes substantially the same movement of the moving element of the instrument in all positions of said element.

9. An electric measuring instrument having a pivoted shaft, a thin metallic plate carried thereby having an opening therethrough on one side of the shaft, a coil in said opening of a thickness not greater than that of the plate, means for connecting the coil in circuit, and two permanent magnets mounted in position with the poles closely embracing the plate on opposite sides of the shaft, and having the corners of the pole ends away from the shaft rounded off.

10. In an electric measuring instrument, a pivoted shaft, an indicator carried thereby, and a spring to retract the indicator to the zero position, said spring having its ends and a portion intermediate the ends secured one to the shaft and the other to a stationary portion of the instrument.

11. In a measuring instrument, a pivoted shaft, an indicator carried thereby, and a helical spring to retract the indicator to the zero position, having its ends secured to the shaft and a portion intermediate the ends secured to a stationary portion of the instrument.

In witness whereof I have hereunto set my hand this 13th day of February, 1905.

ELIHU THOMSON.

Witnesses:
   JOHN A. McMANUS, Jr.,
   DUGALD McK. McKILLOP.